United States Patent [19]

Nagamoto et al.

[11] Patent Number: 4,581,190

[45] Date of Patent: Apr. 8, 1986

[54] PROCESS FOR PRODUCING A WOOD-TYPE GOLF CLUB HEAD

[75] Inventors: Itsushi Nagamoto; Tatsuo Nakanishi, both of Shizuoka, Japan

[73] Assignee: Nippon Gakki Seizo Kabushiki Kaisha, Japan

[21] Appl. No.: 486,358

[22] Filed: Apr. 19, 1983

[30] Foreign Application Priority Data

| Apr. 23, 1982 | [JP] | Japan | 57-68478 |
| Apr. 23, 1982 | [JP] | Japan | 57-68479 |
| Jun. 26, 1982 | [JP] | Japan | 57-110471 |
| Jul. 5, 1982 | [JP] | Japan | 57-116383 |

[51] Int. Cl.$^4$ ............... B29C 67/14; A63B 53/04
[52] U.S. Cl. ............... 264/136; 264/137; 264/257; 264/258; 264/317; 273/167 H; 273/167 R
[58] Field of Search ............... 264/136, 137, 317, 257, 264/258; 273/167 H, 167 R

[56] References Cited

U.S. PATENT DOCUMENTS

| 845,184 | 2/1907 | Longren | 264/137 X |
| 2,768,921 | 10/1956 | Pigg | 264/137 X |
| 2,995,781 | 8/1961 | Sipler | 264/137 |
| 3,008,859 | 11/1961 | Smack | 264/317 X |
| 3,692,306 | 9/1972 | Glover | 273/172 X |
| 4,449,707 | 5/1984 | Hayashi et al. | 273/167 H X |
| 4,451,041 | 5/1984 | Hayashi et al. | 264/257 X |

FOREIGN PATENT DOCUMENTS

| 2151640 | 5/1973 | Fed. Rep. of Germany | 264/137 |
| 52-18769 | 2/1977 | Japan | 264/136 |
| 54-37175 | 3/1979 | Japan | 264/317 |

*Primary Examiner*—Jan Silbaugh
*Attorney, Agent, or Firm*—Lerner, David, Littenberg, Krumholz & Mentlik

[57] ABSTRACT

In production of a wood-type golf club head having a fiber reinforced shell, a fiber reinforced plastic covering containing long fibers is molded into the shell by application of heat under pressure which enables the shell to fairly assume the complicated configuration of the club head, and use of long fibers assure uniformly oriented reinforcement which results in enhanced elastic impact at hitting balls.

15 Claims, 18 Drawing Figures

PROCESS FOR PRODUCING A WOOD-TYPE GOLF CLUB HEAD

BACKGROUND OF THE INVENTION

The present invention relates to improved process for producing a wood-type golf club head, and more particularly relates to improvement in production of an artificial wood-type golf club head including a core and a fiber reinforced plastic shell embracing the core.

A wood-type golf club head in general includes a main body made of woods such as persimmon or maple, and the main body is accompanied with a face plate made of ABS resin or the like attached to its face side and a mass made of brass or the like attached to its sole side in order to increase impact by inertia for longer flight distance of balls.

However, recent general trend of difficulty in obtaining high quality wooden materials has disenabled easy low cost production of such wood-type golf club heads. In addition, the relating complicated configurations of wood-type golf club heads have required high technique in production which naturally furthered the diffuculty in their low cost production. For these reasons, it is now next to impossible to supply wood-type golf club heads of admissible quality at low prices despite the increasing demand on market.

In order to meet this situation, an artificial wood-type golf club head has already been proposed as a substitute which includes a fiber reinforced plastic shell filled with synthetic resin foam core. However, the above-described complicated configurations of wood-type golf club heads have made it difficult to employ this proposed idea in the real commercial produciton at reasonable cost.

Further, this prior art proposes the use of short fibers such as glass fibers for reinforcement of plastics. Uncontrolled, random deposition of such short fibers in the fiber reinforced construction causes significant lowering in the elastic nature of the club head and poor reinforcement of the construction. In order to cover these demerits, one needs to enlarge the thickness of the fiber reinforced plastic shell, which naturally connects to heavy construction of the resultant club head.

Furthermore, use of short fibers for the fiber reinforced plastic shell makes it difficult to distribute the fibers uniformly over the entire outer surface of the club head. When any flat textile elements such as woven cloths are used for the fiber reinforced plastic shell, the textile elements cannot fairly follow the complicated configuration of club heads and this results in poor combination between the core and the shell.

SUMMARY OF THE INVENTION

It is one object of the present invention to provide a commercially feasible process for producing an artificial wood-type golf club head which is made of a core and a fiber reinforced shell without any increase in production cost.

It is another object of the present invention to provide a process for producing a wood-type golf club head which assures ideal elastic impact at hitting balls without any increase in weight.

It is the other object of the present invention to highly develop, in a golf club head having a fiber reinforced plastic shell, reinforcement by fibers.

In accordance with one aspect of the present invention, a core attached to a holder is covered with a reinforcing fiber bag which is then impregnated with synthetic resin solution to form a fiber reinforced plastic covering, and the fiber reinforced plastic covering with the core is then placed in position in the cavity of a mold for subsequent molding by application of heat under pressure.

In accordance with another aspect of the present invention, an impervious bag attached to a holder is covered with a reinforcing bag which is then impregnated with synthetic resin solution to form a fiber reinforced plastic covering, the fiber reinforced covering with the impervious bag is then placed in position in the cavity of a mold, and the impervious bag is inflated by introduction of compressed air during subsequent molding by application of heat.

In accordance with the other aspect of the present invention, a core attached to a holder is covered with plastic material containing long fibers to form a fiber reinforced plastic covering, and the fiber reinforced plastic covering with the core is then placed in position in the cavity of a mold for subsequent molding by application of heat under pressure.

DESCRIPTION OF THE PREFERRED EMBODIMENT

Figure 1:
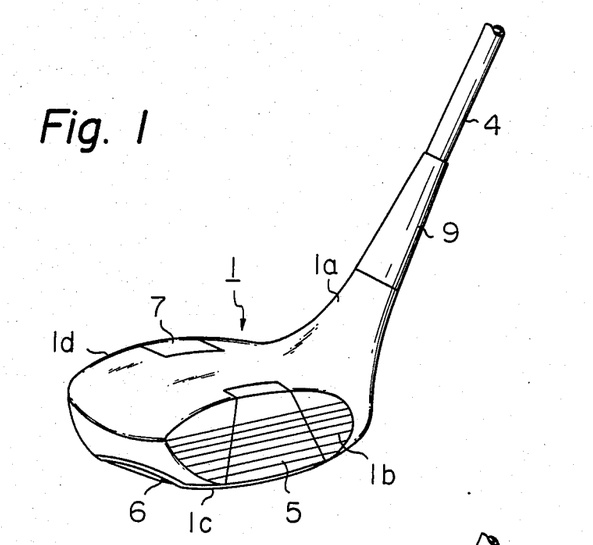
FIG. 1 is a perspective view of one example of the wood-type golf club head produced by one process of the present invention.
Figure 2:
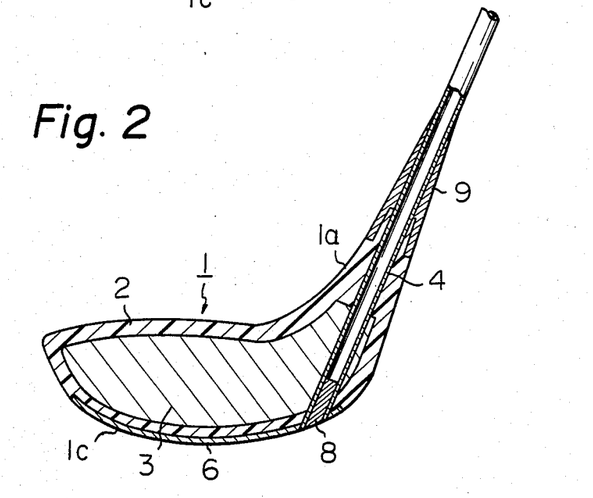
FIG. 2 is a sectional side view of the club head shown in FIG. 1, FIGS. 3 to 6 are sectional views for showing the operational steps of one embodiment of the process in accordance with the present invention.

One example of the wood-type golf club head is shown in FIGS. 1 and 2, in which the club head 1 includes a core 3 made of wood or foam synthetic resin and a fiber reinforced plastic shell 2 embracing the core 3. A club shaft 4 is secured to and extend through the proximal end section 1a of the club head 1. The club head 1 is further provided with a face plate 5 made of ABS resin or the like and attached to the face side 1b, a sole plate 6 made of brass strap and attached to the sole side 1c and a metallic weight 7 attached to the back side 1d. The club shaft 4 in this example has a tubular construction which terminates at the sole side 1c and its open end is closed by a plug 8. A protector 9 is attached to the connection between the proximal end section 1a of the club head 1 and the club shaft 4. Thus, the club shaft 4 is stably connected to the club head 1 at two points, one to the sole side of the fiber reinforced plastic shell 2 and the other to the proximal end section 1a of the club head 1 and the protector 9.

One embodiment of the process in accordance with the present invention is shown in FIGS. 3 to 6, in which a reinforcing fiber bag is used for forming the fiber reinforced plastic covering. In this case, a club shaft of an elongated tubular construction is used for the holder 10 and the protector 9 is in advance secured to the club shaft. A core 11 is then secured to the holder 10 in such an arrangement that the distal end 10a of the holder 10 should project from the sole side of the core 11. Next the core 11 and the connecting section of the holder 10 to the core 11 are wholly covered with a bag 12 made of long reinforcing fibers such as carbon fibers.

Figure 3:
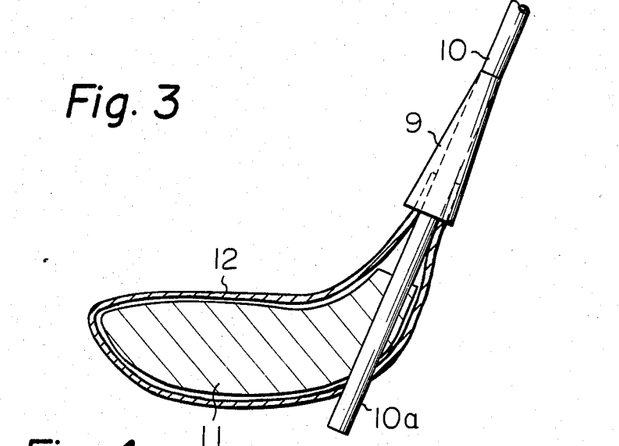
Figure 4:
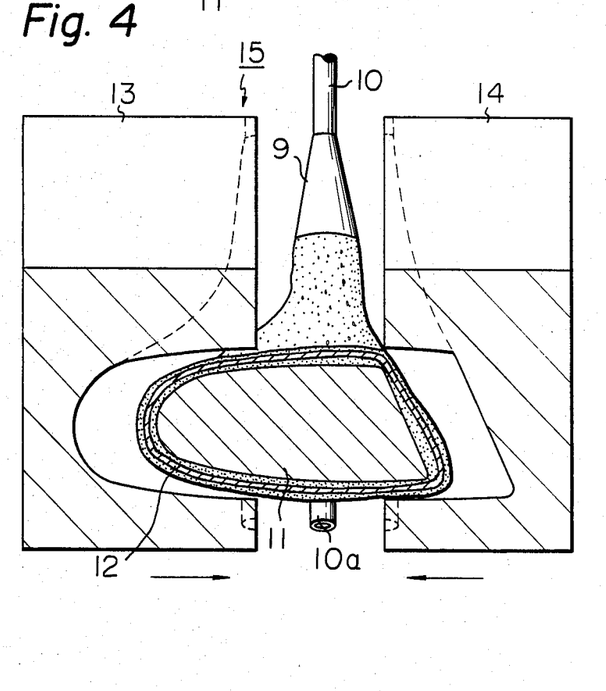
Figure 5:
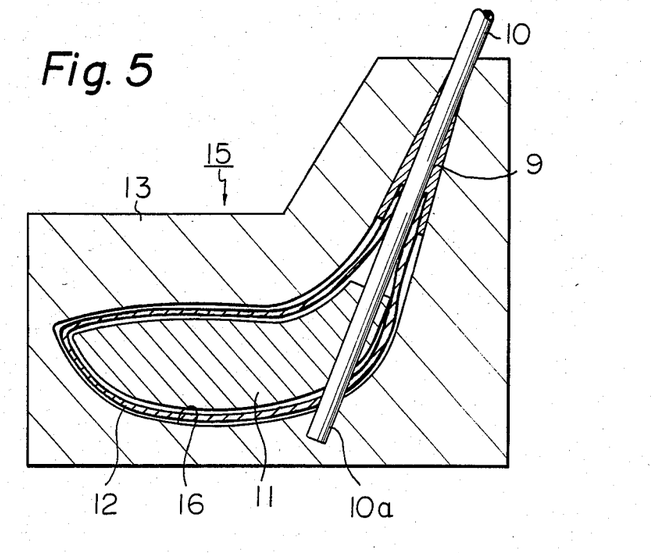
Figure 6:
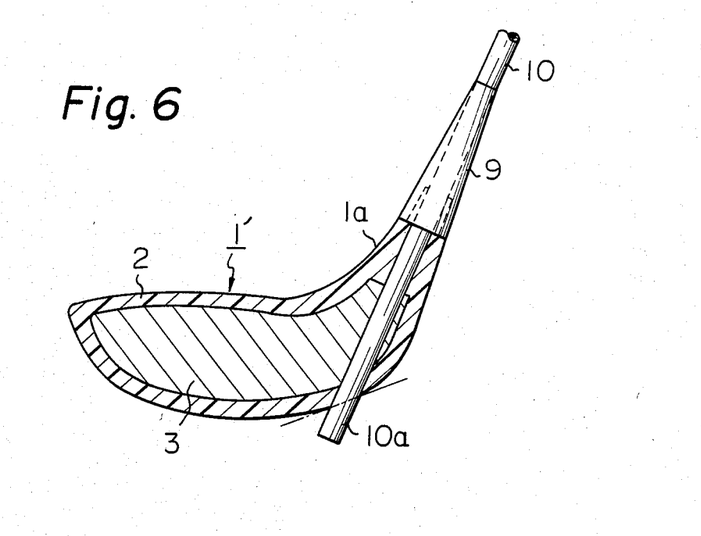

The reinforcing fiber bag 12 is then impregnated with solution of synthetic resin such as epoxy or polyester resin for formation of a fiber reinforced plastic covering as shown in FIG. 3. Then the fiber reinforced plastic covering with the core 11 is placed in position in the cavity 16 of a mold 15 made up of a pair of mold halves 13 and 14 as shown in FIGS. 4 amd 5. Stable positioning in the mold 15 can be attained by nipping the holder 10 by the pair of mold halves 13 and 14. After molding by application of heat under pressure, an incomplete club head 1' is removed from the mold 15, the exposed distal end 10a of the holder 10 is cut off and the open end of the holder 10, i.e. the club shaft, is closed by the plug 8 in order to obtain a complete club head 1 as shown in FIGS. 1 and 2.

Figure 7A:
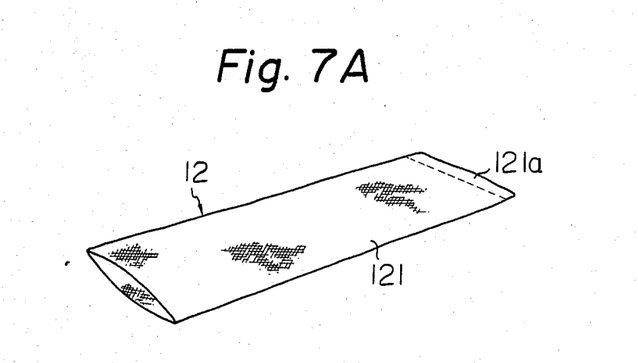
FIGS. 7A to 7C are perspective and sectional side views for showing one example of the process for forming the reinforcing fiber bag used for the process shown in FIGS. 3 to 6, FIGS. 8A and 8C are perspective and sectional side views for showing another example of the process for forming the reinforcing fiber bag advantageously used for the process shown in FIGS. 3 to 6, FIGS. 9 to 11 are sectional side views for showing the operational steps of another embodiment of the process in accordance with the present invention.
Figure 7B:
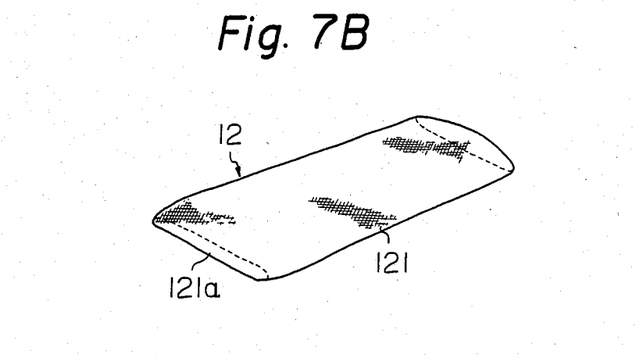
Figure 7C:
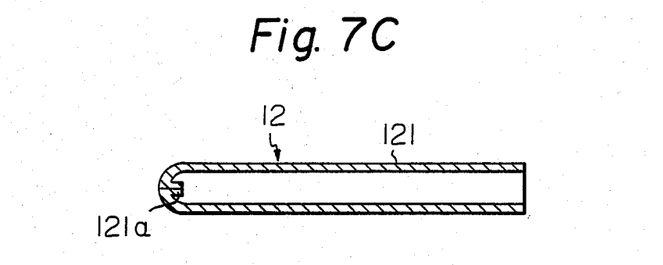

One embodiment of the process for forming the above-described reinforcing fiber bag 12 is shown in FIGS. 7A to 7C. The bag 12 is preferably given in the form of a hollow cloth 121 in which reinforcing fibers are interlaced. One end 121a of the hollow cloth is closed by bonding or sewing as shown in FIG. 7A, and the entire body is turned inside out as shown in FIGS. 7B and 7C so that the closed end 121a is located inside.

After placing the core 11 inside, the open end of the bag 12 is squeezed so that it should fairly follow the configuration of the core 11.

Figure 8A:
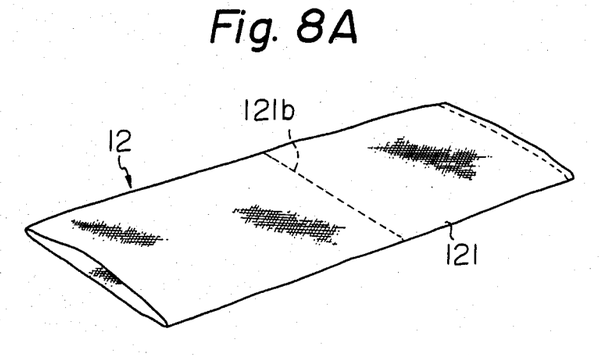
Figure 8B:
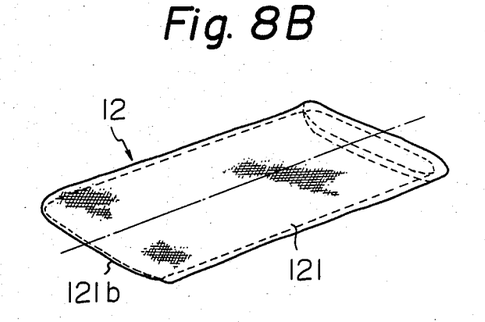
Figure 8C:
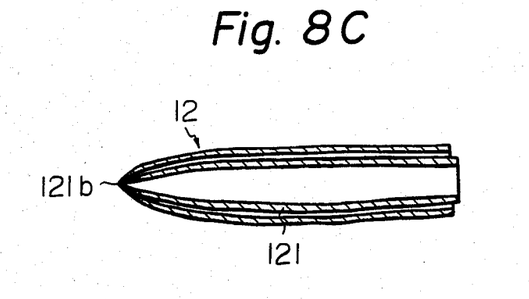

Another embodiment of the process for forming the above-described reinforcing fiber bag 12 is shown in FIGS. 8A to 8C in which the bag 12 is again given in the form of a hollow cloth 121. The hollow cloth 121 is closed transversely by bonding or sewing about the middle of its length as shown in FIG. 8A and one longitudinal side of the hollow cloth 121 folded back about the closed section 121b over the other longitudinal side of the hollow cloth 121. Thus, when the original hollow cloth 121 has a n-layer construction, the bag 12 has a 2n-layer construction and reinforcement by the bag 12 in the fiber reinforced shell 2 can be redoubled.

The weaving density of the bag 12 varies depending on the section of the club head which it reinforces. Generally speaking, one fibrous bundle includes from 3,000 to 12,000 fibers and from 24 to 96 fibrous bundles are used for each bag. Alternatively, a bag may be made up of from 6 to 50 sheets of superposed cloths each having 0.3 mm thickness.

Carbon fiber is most advantageously used for the reinforcing fiber in accordance with the present invention solely or in mixture with other fibers such as glass fiber and Kevlar. In any case, the content ratio of the carbon fiber in the cloth forming the bag should preferably be 30% or larger for appreciable reinforcement.

For use on the face side of the club head, a carbon fiber cloth may be used in combination with a glass fiber cloth or the like. In this case, from 2 to 30 sheets of cloths may be superposed.

The thickness of the fiber reinforced shell 2 should preferably be in a range from 2 to 15 mm.

In one practical example of the present invention, the core is made of foam resin and epoxy resin is used for the reinforcing fiber. Molding by thermal pressing is carried out at 110° C. temperature, 5 to 10 Kg/cm$^2$ pressure for about 30 minutes.

In accordance with the process shown in FIGS. 3 to 6, the produced club head 1 has a solid construction in which the core is wholly embraced by a fiber reinforced plastic shell. It is, however, also employable in the process of the present invention to provide the club head with a hollow construction. In one example, the core is made of a material such as salt and foam styrene which is soluble to a certain sort of solvent and, after removal from the mold, the core is removed from the club head by application of such solvent. In another example, the core is made of wax or metal of low melting point and, after removal from the mold, the core is removed from the club head by application of heat.

At molding, the face plate, the sole plate and the metallic weight may be placed in position together with the fiber reinforced plastic covering and the core in the operational step shown in FIG. 4 so that these attachments can be molded concurrently.

In the case of the process shown in FIGS. 3 to 6, pressure is applied, during the molding, to the fiber reinforced covering from its outer side so that it should be pressed against the inside core during the molding by application of heat. In this case, the core has to be placed in the reinforcing fiber bag before the molding. This is rather inconvenient when a club head of a hollow construction is wanted since the core has to be removed from the core head after the molding.

Figure 9:
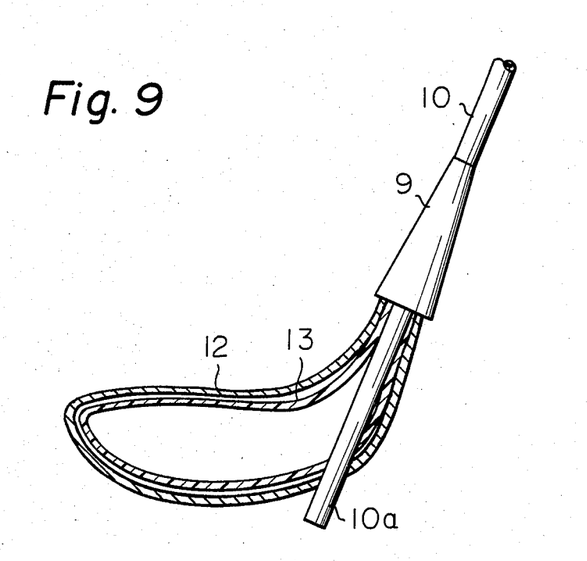
Figure 10:
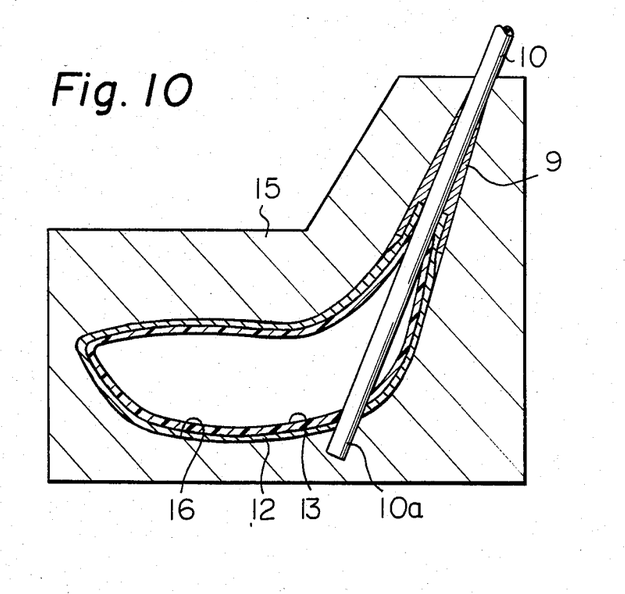
Figure 11:
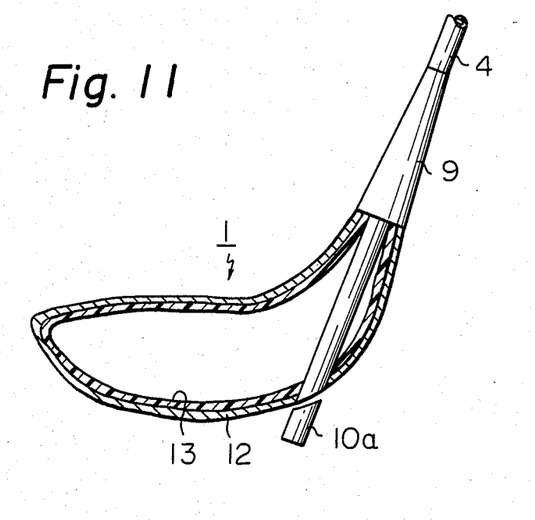

Another embodiment of the process in accordance with the present invention which well precludes the above-described inconveniency is shown in FIGS. 9 to 11. In this case, a second bag made of impervious material such as vinyl chloride is used in combination with the reinforcing fiber bag. More specifically, an impervious bag 13 attached to a holder 10 is wholly covered with a reinforcing fiber bag 12 as shown in FIG. 9. Next, the bags 12 and 13 are both placed in the cavity 16 of a mold 15. If desired attachments such as a face plate may also be placed together. After this setting, the impervious bag 13 is inflated by introduction of air vapor or liquid (e.g. oil) pressure, during molding so that the reinforcing fiber bag 12 should be pressed from inner side against the wall of the cavity 16 as shown in FIG. 10. By removal from the mold 15, a hollow club head 1 such as shown in FIG. 11 is obtained. If desired, foam resin may be injected into the interior cavity of the impervious bag in order to form a core.

Figure 12:
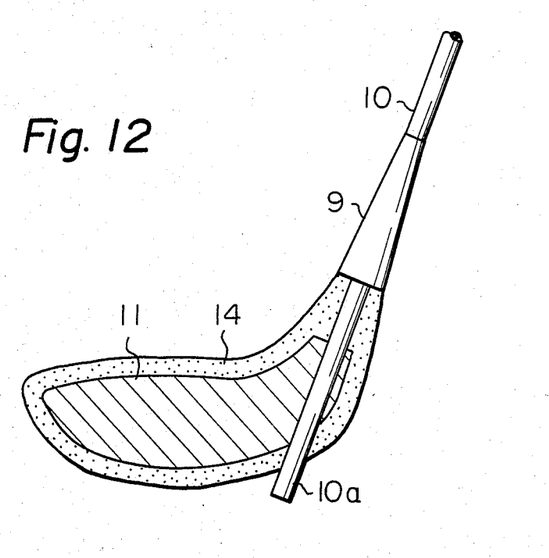
FIGS. 12 to 14 are sectional side views for showing the operational steps of the other embodiment of the process in accordance with the present invention.
Figure 13:
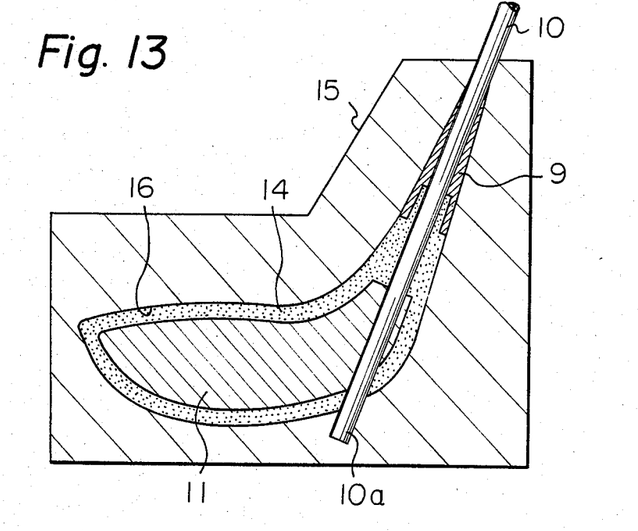
Figure 14:
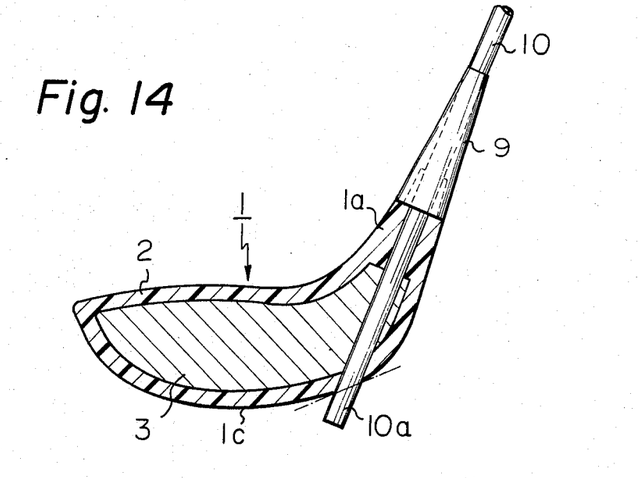

The other embodiment of the process in accordance with the present invention is shown in FIGS. 12 to 14. In this case, a club shaft of an elongated tubular construction is again used for the holder 10 and the protector 9 is in advance secured to the club shaft. A core 11 is then secured to the holder 10 in such an arrangement that the distal end 10a of the holder 10 should project from the sole side of the core 11. Next, the core 11 and the connecting section of the holder 10 to the core 11 are wholly covered with plastic material 14 containing long fibers such as carbon fibers as shown in FIG. 12 in order to form a fiber reinforced plastic covering. Then the fiber reinforced plastic covering with the core 11 is placed in position in the cavity 16 of the mold 15. In this case, same sort of plastic material containing long fibers may additionally placed in the cavity 16 of the mold 15 as shown in FIG. 13. Further, attachments such as a face plate may also be placed in position in the cavity 16 of the mold 15. After molding by application of heat, an incomplete club head 1' is removed from the mold 15, the exposed distal end 10a of the holder 10 is cut off and the open end of the holder, i.e. the club shaft, is closed by the plug 8 in order to obtain a complete club head 1 as shown in FIGS. 1 and 2.

Like the first embodiment, the core 11 may be removed after the molding by application of a suitable solvent or heat in order to provide a hollow construction.

BMC, SMC or prepreg is advantageously used for the plastic material containing long fibers.

In accordance with the present invention, molding of the fiber reinforced plastic covering is carried out by application of heat under pressure. This combination of heat with pressure well enables the fiber reinforced plastic shell to easily assume the complicated configuration of the club head, and this possibility connects to commercially feasible production of an artificial wood-type golf club head having a fiber reinforced plastic shell.

Use of long fibers for the fiber reinforced plastic shell results in uniform fiber orientation which connects to ideal reinforcement without any substantial increase in weight.

These all concur to enhance elastic impact by the club head at hitting balls which connects to long distance of flight.

We claim:

1. Improved process for producing a wood-type golf club head comprising
    covering a solid core with a reinforcing fiber bag made of long fibers,
    impregnating said reinforcing fiber bag with synthetic resin solution to form a fiber reinforced plastic covering,
    placing said fiber reinforced plastic covering with said core in position within the cavity of a mold, said cavity having the shape of a wood-type golf club head, and
    molding said fiber reinforced plastic covering into a fiber reinforced plastic shell by application of heat under external pressure to said core, said long fibers being of sufficient length to be uniformly oriented witin said shell as said reinforcing fiber bag conforms to the shape of said cavity during said appliation of heat under external pressure, whereby said wood-type golf club head has enhanced reinforcement without substantial weight increase and enhanced elastic impact in hitting balls over wood-type golf club heads including short fibers.

2. Improved process as claimed in claim 1 further comprising removing said core after said molding.

3. Improved process as claimed in claim 2 in which
    said core is made of a material soluble to a certain sort of solvent, and
    said core is removed by application of said sort of solvent after said molding.

4. Improved process as claimed in claim 2 in which
    said core is made of a material vurnerable to heat, and
    said core is removed by application of heat after said molding.

5. Improved process as claimed in claim 1 in which said reinforcing fiber bag is made of a hollow cloth.

6. Improved process as claimed in claim 5 in which
    said hollow cloth is closed at one longitudinal end and turned inside out so that the closed end should be located inside.

7. Improved process as claimed in claim 5 in which
    said hollow cloth is closed transversely about the middle of its length and
    one longitudinal side of said hollow cloth is folded back about the closed middle section over the other longitudinal side of said hollow cloth.

8. Improved process as claimed in claim 5 in which said hollow cloth contains from 24 to 96 fibrous bundles.

9. Improved process as claimed in claim 8 in which each said fibrous bundle contains from 3,000 to 12,000 fibers.

10. Improved process as claimed in claim 5 in which said reinforcing fiber bag contains from 6 to 50 hollow cloth sheets each having a 0.3 mm thickness.

11. Improved process as claimed in claim 1 in which the thickness of said fiber reinforced plastic covering is adjusted so that the thickness of said fiber reinforced shell should be in a range from 2 to 15 mm.

12. Improved process as claimed in claim 1 in which said fiber reinforced covering contain carbon fibers.

13. Improved process as claimed in claim 12 in which the content ratio of said carbon fiber in said long fibers is 30% or larger.

14. Improved process as claimed in claim 1 in which said fiber reinforced plastic covering contains at least one of epoxy and polyester resins.

15. Improved process as claimed in claim 1 in which other attachments are placed in position in said cavity of said mold in contact with said fiber reinforced plastic covering before molding.

* * * * *

UNITED STATES PATENT AND TRADEMARK OFFICE
CERTIFICATE OF CORRECTION

PATENT NO. : 4,581,190

DATED : April 8, 1986

INVENTOR(S) : Nagamoto, et al.

It is certified that error appears in the above-identified patent and that said Letters Patent is hereby corrected as shown below:

Column 5, line 50, "appliation" should read -- application --.

Signed and Sealed this

Fifth Day of August 1986

[SEAL]

Attest:

DONALD J. QUIGG

Attesting Officer

Commissioner of Patents and Trademarks